United States Patent [19]

Corrigan, III

[11] Patent Number: 4,518,217
[45] Date of Patent: May 21, 1985

[54] ELECTRICAL CONNECTOR AND RECEPTACLE

[76] Inventor: John J. Corrigan, III, Carmel Hill Rd., Washington, Conn. 06793

[21] Appl. No.: 482,962

[22] Filed: Apr. 8, 1983

[51] Int. Cl.³ .......................................... H01R 17/18
[52] U.S. Cl. .............................. 339/183; 339/177 R
[58] Field of Search .............................. 320/2, 35, 36; 339/182 R, 183

[56] References Cited

U.S. PATENT DOCUMENTS

| | | | |
|---|---|---|---|
| 2,338,141 | 1/1944 | Steckel | 339/183 X |
| 2,911,614 | 11/1959 | Davis | 339/182 R |
| 3,667,026 | 5/1972 | Bogut et al. | 320/36 |
| 3,977,907 | 8/1976 | Roth et al. | 339/183 X |
| 4,018,501 | 4/1977 | Maloof | 339/183 |

Primary Examiner—Eugene F. Desmond

[57] ABSTRACT

An electrical connector and receptacle for use with battery packs and battery charging equipment are disclosed. The electrical connector includes a two terminal coaxial plug and a third contact coaxial with the two terminal plug. The third contact may carry a signal responsive to a selected battery condition, such as temperature, while the two terminals of the coaxial plug carry battery supply voltage. In normal use, the electrical connector supplies power from a battery pack to portable battery powered equipment via an input jack of the portable equipment. The third contact is not used. When charging the battery pack, the electrical connector is plugged into an electrical receptacle of the battery charging equipment and the third contact delivers a signal to the battery charging equipment which indicates battery condition. The battery charging equipment receptacle which mates with the connector is also disclosed.

3 Claims, 4 Drawing Figures

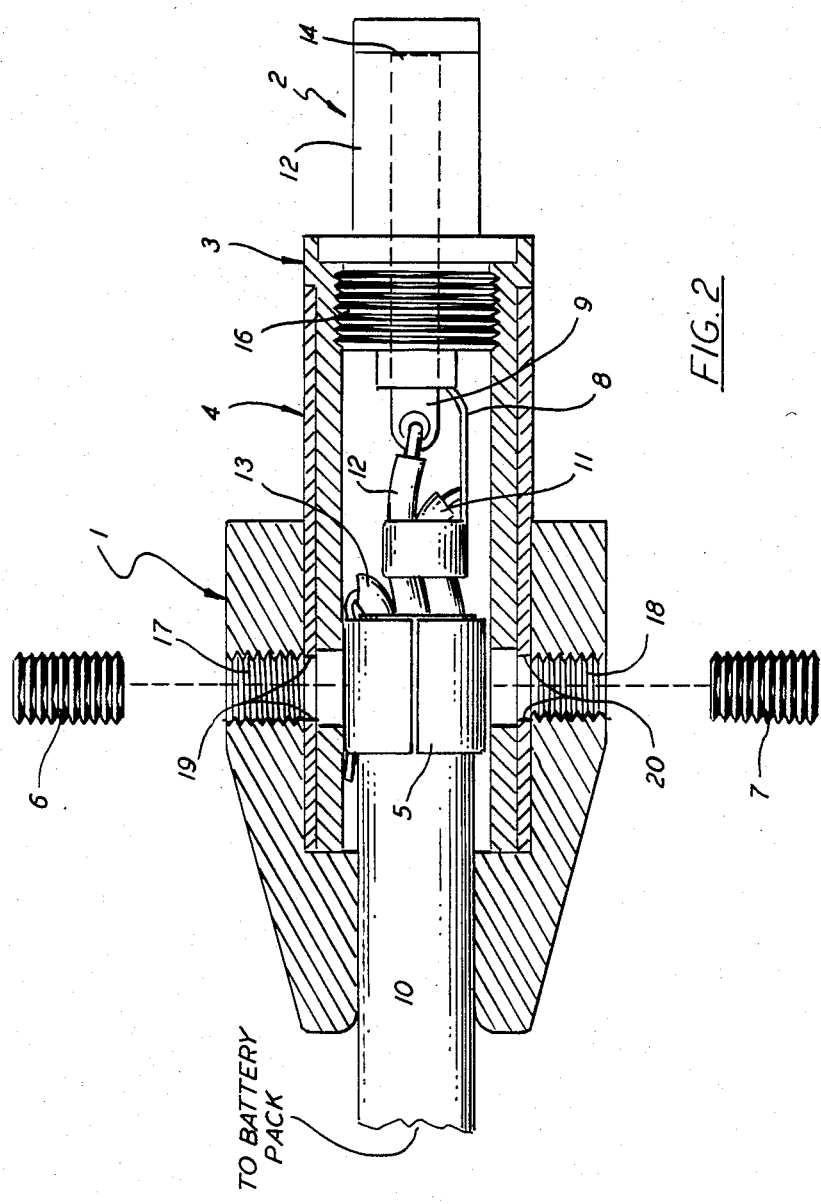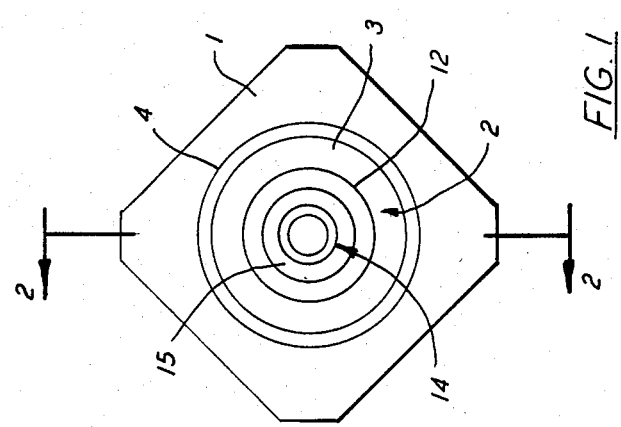

ELECTRICAL CONNECTOR AND RECEPTACLE

BACKGROUND OF THE INVENTION

The present invention relates to the field of electrical connectors, and more particularly to an electrical connector and receptacle for use with portable battery packs and battery charging equipment.

Battery powered equipment, such as portable video tape recorders, typically have input jacks for the supply of power from external portable battery packs. These input jacks, however, are of generally two conductor design, and a two conductor cable couples the battery pack to the input jack via an electrical plug.

In addition to supplying power to the portable equipment, the cable leading to the battery pack should also be able to be used for conveniently charging the battery pack from an external charger. In battery chargers having a fast charging feature, it is desirable to monitor a selected condition of the battery during charging, such as battery temperature, so that the battery temperature does not exceed that temperature at which battery damage is likely to occur. In order to monitor the temperature, thermal sensors are provided integral with the battery pack and a signal is delivered to the charging equipment when the battery pack exceeds the predetermined temperature so that the charging current can be reduced or stopped. Thus, a third conductor is required in the cable leading away from the battery pack so that the cable can be coupled to both the battery charging equipment and the portable battery powered equipment. When powering the portable equipment, the temperature sensing third conductor is not used.

It is therefore an object of the present invention to provide an electrical connector which can be used for both connecting the battery pack to the battery powered equipment so as to provide power and also for connecting the battery pack to battery charging equipment which utilizes a three conductor charging circuit and which is at the same time compatible with standard battery input jacks typically found on battery powered equipment, for example, video tape recorders.

It is a further object of the present invention to provide an electrical receptacle which mates with the above connector and which can be used as the output connector in battery charging equipment which utilizes a third conductor for sensing a selected battery condition, such as temperature.

SUMMARY OF THE INVENTION

These and other objects of the present invention are achieved by an electrical connector assembly including an electrical connector comprising:

two terminal electrical plug means compatible with electrical jack means of portable battery powered equipment for supplying electrical power to the battery powered equipment from first and second conductors coupled to a battery;

sleeve contact means coaxial with the electrical plug means and insulated therefrom, the sleeve contact means adapted to be electrically connected to a third conductor, the third conductor coupled to the battery for supplying a signal indicative of the status of a selected condition of the battery; and housing means coaxial with the plug means and the sleeve contact means and having an opening for receiving the electrical conductors.

An electrical receptacle for use as the output jack of battery charging equipment and which mates with the electrical connector is also disclosed. This receptacle comprises:

two terminal electrical jack means adapted to couple with the two terminal electrical plug means; and additional electrical contact means disposed in front of the two terminal jack means for making electrical contact with the sleeve contact means, the additional contact means insulated from the two terminal jack means.

The present invention has the advantage that the electrical connector is compatible with various types of battery powered portable equipment which uses a coaxial type power input jack. Additionally, the electrical connector allows proper charging of battery packs having battery condition sensors, such as thermal sensors, so that the condition of the battery pack can be monitored by the charging equipment. An electrical receptacle including a third electrical contact for use with the battery charging equipment which mates with the electrical connector allows the latter to be accomplished.

BRIEF DESCRIPTION OF THE DRAWINGS

The present invention will be described in greater detail with reference to the accompanying drawings, in which:

FIG. 1 is a front view of the electrical connector;

FIG. 2 is a sectional side view of the electrical connector taken along lines 2—2 of FIG. 1;

DETAILED DESCRIPTION

Figure 4:
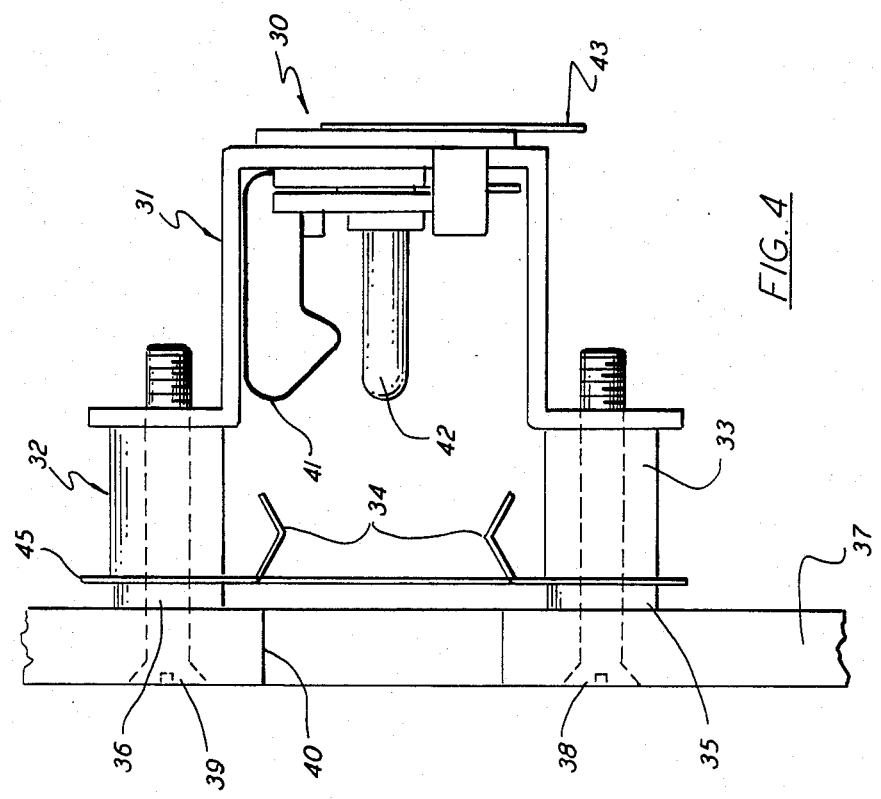
FIG. 4 is a sectional side view of the electrical receptacle taken along lines 4—4 of FIG. 3.

With reference now to the drawings, the electrical connector is shown in FIGS. 1 and 2. The connector includes an external housing 1, which may be made of molded plastic, a standard coaxial type two conductor battery plug 2, insulated sleeve 3, external conducting sleeve contact 4, clamping collar 5 and set screws 6 and 7. An electrical cable 10 leading from the battery pack enters an aperture in the housing 1. Standard two conductor battery plug 2 includes two wire connection points 8 and 9 to which wire conductors 11 and 12 of the cable 10 are connected. Wires 11 and 12 lead to the battery pack and are connected to the positive and negative supply terminals of the battery pack. Connection point 8 is connected to the external conducting cylindrical contact 12 of the standard plug 2. Connection point 9 is connected to the internal conducting cylindrical contact 14 of the plug. Contacts 12 and 14 are insulated from each other by insulator 15. The interior of cylindrical contact 14 is hollow so that it can engage with a corresponding contact of an electrical receptacle or jack. Plug 2 mates with an appropriate power input jack of the portable battery powered equipment or, when the battery pack is being charged, with the receptacle shown in FIGS. 3 and 4 which can be used as the output jack of the battery charging equipment.

The connector shown in FIGS. 1 and 2 further includes external sleeve contact 4 insulated from standard plug 2 by insulator 3 coaxially disposed about plug 2. Standard plug 2 may be threaded into the insulator as shown by the threads 16. Means are provided for obtaining electrical contact between wire 13, the temperature sensing wire, and sleeve 4. In the illustrated embodiment, set screws 6 and 7 are threaded into the housing 1 through bores 17 and 18 and makes contact with sleeve 14 via an interference fit at 19 and 20 and with the clamping collar 5, to which the wire 13 is clamped and/or soldered. Thus, the electrical contact between the wire 13 and sleeve contact 4 is established and the cable 10 is securely fastened in the housing 1. Alternatively, other means could be used to connect the wire 13 to the sleeve contact 4. For example, wire 13 could be directly soldered or bolted to the sleeve contact 4 or coupled to the sleeve contact 4 via a crimp connector.

In normal use when the battery pack is supplying power to the battery powered equipment, the sleeve 4 is not connected to the equipment and only the cylindrical contacts 12 and 14 make contact with the battery input jack of the portable battery powered equipment. When charging, however, sleeve contact 4 engages with a corresponding contact of the jack which is a part of the battery charging equipment, so that the battery temperature may be monitored.

Figure 3:
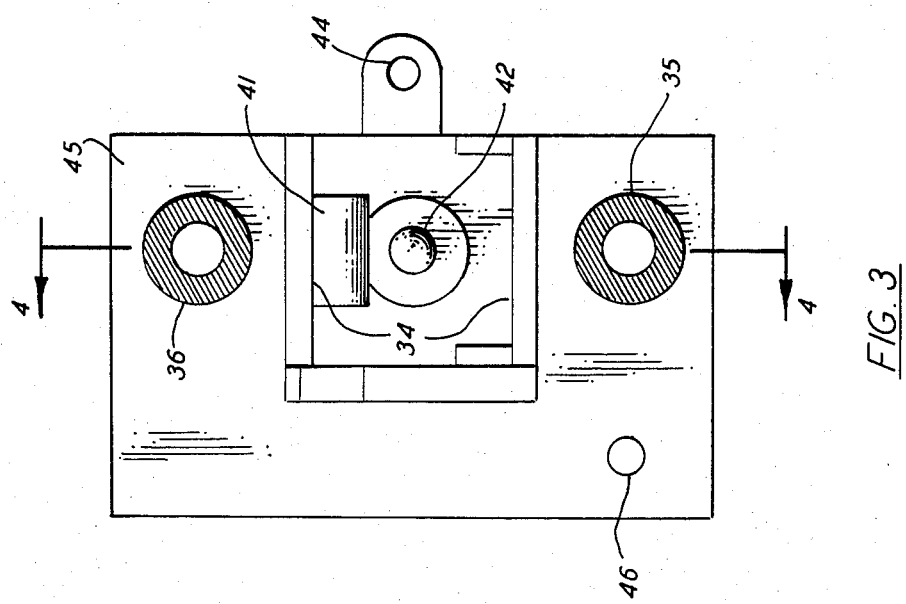
FIG. 3 is a front view of the electrical receptacle for use with the electrical connector of FIGS. 1 and 2.

The corresponding receptacle for the battery charging equipment is shown in FIGS. 3 and 4. The receptacle includes standard two terminal coaxial battery jack 30 mounted to bracket 31, insulating spacers 32 and 33, plate 45 having spring contacts 34 projecting into the area defined by the aperture 40 and insulating spacers 35 and 36. The receptacle is shown mounted to a wall 37 of the battery charging equipment by screws 38 and 39 insulated from plate 45. The connector of FIGS. 1 and 2 mates with the receptacle via aperture 40 in the wall and in plate 45. In particular, sleeve contact 4 of the connector engages with projecting spring contacts 34 so that the battery temperature sensing wire is connected to the battery charging equipment.

Jack 30 includes external spring contact 41 and center contact 42, which mate with coaxial cylindrical contacts 12 and 14 respectively, of the connector shown in FIGS. 1 and 2. Wires are soldered to lugs 43 and 44 and supply power to the receptacle for battery charging. The battery temperature sensing wire of the battery charging equipment is soldered or bolted to plate 45 via hole 46.

Although the described connector and receptacle have particular application to batteries, battery powered equipment and battery charging equipment, it is readily apparent that the electrical connector and receptacle described can be used for other purposes outside the field of batteries and battery charging.

Additionally, the present invention could be modified so that the connector might be manufactured in a one piece molded plastic or rubber unit wherein all wire connections and contacts are molded integrally into one housing.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An electrical connector comprising:
   two terminal electrical plug means having a first end for engaging with an electrical receptacle and a second end adapted to receive wire connections of an electrical cable, said first end having first cylindrical electrical contact means, insulating means disposed about said first contact means and second cylindrical electrical contact means disposed about said insulating means;
   additional insulating means having a longitudinal opening having first and second ends, the second end of said two terminal electrical plug means disposed in said first end of said opening;
   sleeve electrical contact means disposed about said additional insulating means;
   insulating housing means disposed about and covering a part of said sleeve contact means and having an opening for receiving said electrical cable aligned with the second end of the opening of said additional insulating means; and
   fastening means for fastening said electrical cable securely in said housing means and for making electrical contact between a conductor of said electrical cable and said sleeve contact means, said fastening means comprising:
   screw means disposed in aligned openings in said insulating housing means and said sleeve contact means and engaging in an interference fit with the sides of the opening in said sleeve contact means; and
   clamping collar means disposed about said electrical cable and in electrical contact with said conductor;
   said screw means engaging said clamping collar means so as to securely hold said electrical cable in said insulating housing means and establish electrical contact between said clamping collar means and said sleeve contact means.

2. The electrical connector recited in claim 6, further comprising an electrical receptacle for receiving said electrical connector comprising:
   two terminal electrical jack means adapted to couple with said two terminal electrical plug means; and
   additional electrical contact means disposed in front of said two terminal electrical jack means for making electrical contact with said sleeve contact means, said additional electrical contact means insulated from said two terminal electrical jack means.

3. The electrical connector assembly recited in claim 2 wherein said additional contact means comprises a metal plate having an aperture in alignment with said two terminal jack means for receiving said electrical connector and a spring contact projecting into the area defined by said aperture for engaging with said sleeve contact means.

* * * * *

UNITED STATES PATENT AND TRADEMARK OFFICE
CERTIFICATE OF CORRECTION

PATENT NO. : 4,518,217
DATED : May 21, 1985
INVENTOR(S) : John J. Corrigan, III

It is certified that error appears in the above-identified patent and that said Letters Patent is hereby corrected as shown below:

Column 3, line 4, change "sleeve 14" to --sleeve 4--.

Column 4, line 42, change "claim 6" to --claim 1--.

Signed and Sealed this

Twenty-ninth Day of October 1985

[SEAL]

Attest:

Attesting Officer

DONALD J. QUIGG

Commissioner of Patents and
Trademarks—Designate

UNITED STATES PATENT AND TRADEMARK OFFICE
CERTIFICATE OF CORRECTION

PATENT NO. : 4,518,217
DATED : May 21, 1985
INVENTOR(S) : John J. Corrigan, III

It is certified that error appears in the above-identified patent and that said Letters Patent is hereby corrected as shown below:

On the title page, insert the name of the Assignee, as follows:   --Assignee:   ANTON/BAUER, Inc.,
                            Shelton, Connecticut--

Signed and Sealed this

Third Day of December 1985

[SEAL]

Attest:

DONALD J. QUIGG

Attesting Officer

Commissioner of Patents and Trademarks